Nov. 24, 1936.   W. A. BURNETTE   2,061,610
COMBINATION SKILLET STRUCTURE
Filed Nov. 25, 1935
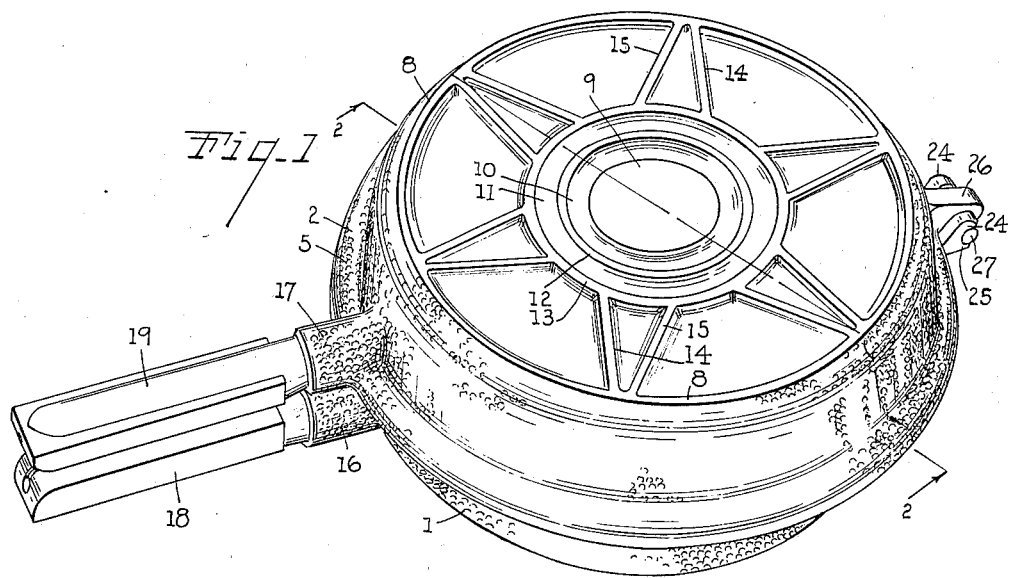
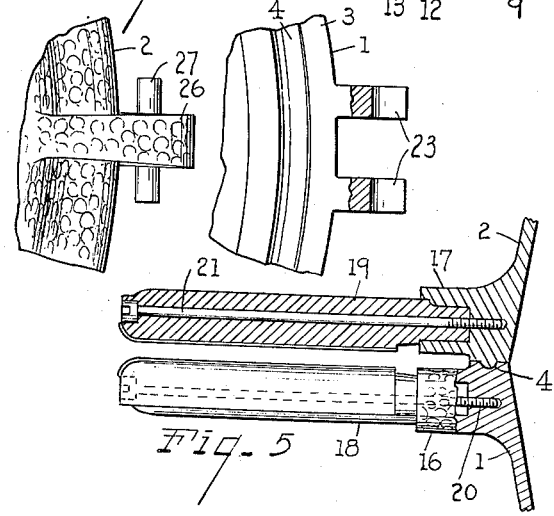
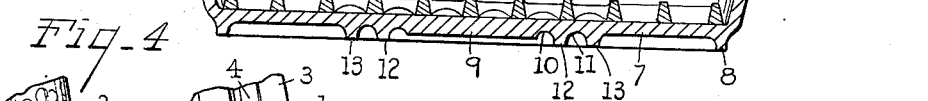
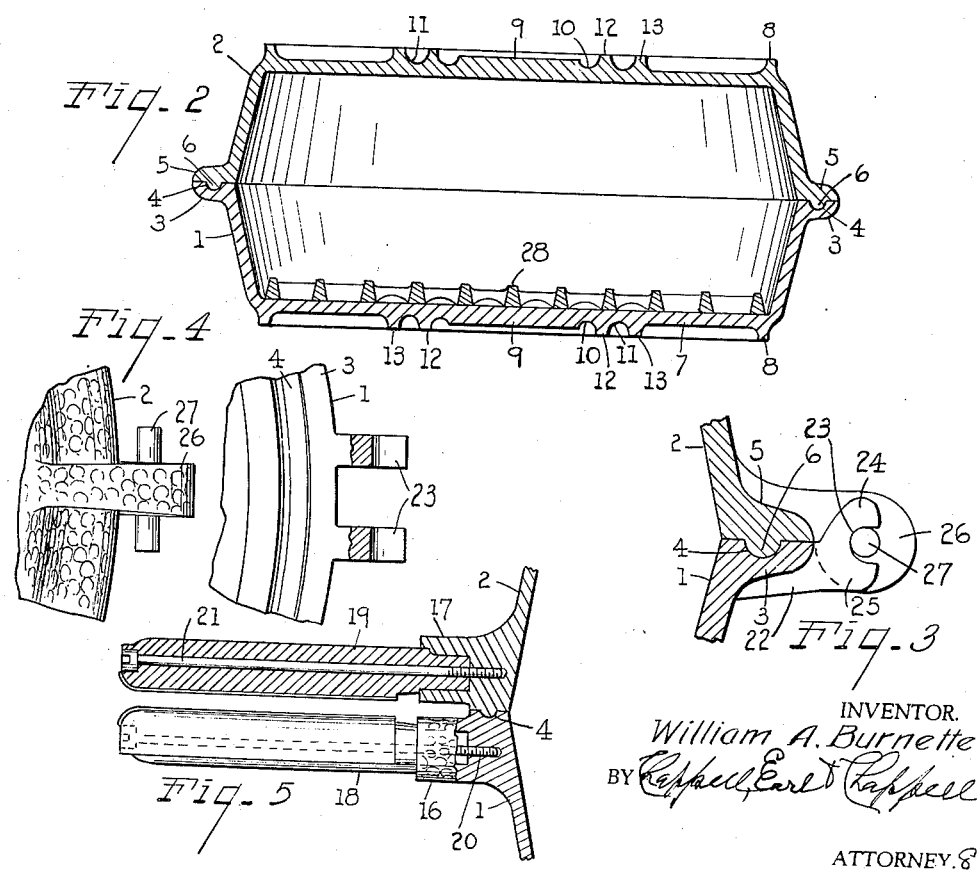
INVENTOR.
William A. Burnette
BY Chappell Earl & Chappell
ATTORNEYS Patented Nov. 24, 1936

2,061,610

UNITED STATES PATENT OFFICE 2,061,610

COMBINATION SKILLET STRUCTURE

William A. Burnette, Hartford, Mich., assignor to Cookware Company of America, Hartford, Mich.

Application November 25, 1935, Serial No. 51,439

2 Claims. (Cl. 53—7)

This invention relates to improvements in combination skillet structure.

The objects of the invention are:

First, to provide an effective structure of double skillet which are symmetrical to each other to form either a closed or open cooking utensil.

Second, to provide such a structure adapted for use in cooking omelets, steaks, all sorts of grilling, meat loaf, cake baking and the baking of beans, macaroni, spaghetti or noodles and the like.

Third, to provide an improved construction of such a device which can be subjected to high heat without material distortion.

Fourth, to provide such a structure in which the parts are readily separable and yet are adapted to form a sealed joint between them.

Fifth, to provide such a structure with an improved bottom plate for the effective distribution of heat and at the same time a structure which will avoid warping.

Sixth, to provide improved means of frying bacon or grilling consisting of an improved grill plate in conjunction with such a structure.

Further objects pertaining to economies and details will appear from the description to follow. A preferred embodiment of my invention is described in the following specification and illustrated in the accompanying drawing, in which:

Fig. 1 is a perspective view of my improved combination skillet cooking utensil in closed position, the top and bottom plates being identical one view is sufficient.

Fig. 2 is an enlarged detail sectional view on the plane of line 2—2 of Fig. 1 showing details of the joint between the parts and the detail relation of the grill.

Fig. 3 is an enlarged detail of the separable hinge structure, portions of the utensil being shown in section whereby the details will appear.

Fig. 4 is a detail view of the hinge part separated, the upper portion of the forked member being broken away.

Fig. 5 is an enlarged detail of the handle structure, one of the handles being in longitudinal section and portions of the skillets being shown in section.

The parts will be identified by their numerals of reference which are the same in all the views.

This combination cooking utensil is made up of a pair of symmetrical skillets. 1 is the bottom skillet and 2 is the top or cover skillet. These are in the form of comparatively deep frying pans. A projecting flange 3 is around the top of the periphery of the bottom skillet containing an annular trough 4 semi-circular in cross section. The top or cover skillet 2 has a peripheral flange 5 and an annular rib 6 semi-circular in cross section and fitting within the trough or annular groove 4. The bottom plate 7 of the bottom skillet is provided with a downwardly projecting external rim 8 at the periphery and with a comparatively thick central disk 9 which, however, is of such thickness that when the bottom skillet 1 is placed upon a plane surface, it will be somewhat above the same (see Fig. 2). Around this disk 9 is an annular semi-circular groove 10 and in spaced relation from it is a similar groove 11, the same forming ribs 12 and 13 which are concentric with the disk 9 and project below the under surface of the same so that they contact with any level surface on which the skillet is placed.

Connecting the outer rib 13 with the peripheral rib 8 are radial star-pointed ribs made up of side ribs 14, 15 which come together substantially at a point within the peripheral rib 8 and are spaced from each other equally where they emerge from the projecting ring 13. These, as shown, constitute in effect a six-pointed star. They are spaced equally from each other and in spaced relation where they connect to the centrally disposed ring rib 13. These ribs dissipate the heat from the center rapidly and equally.

Bosses 16 and 17 project from the periphery of the skillets in opposite relation to each other, the same being bored out to form sockets for the handles 18 and 19. The handles 18 and 19 are substantially square in cross section, made of heat resisting material, and are each retained by central screws 20, 21. The square form enables ready control by the handles.

Opposite the handles the hinge structure of integral construction is formed. This consists of the bottom hinge lug member 22 which contains an outwardly facing notch 23 defined by the fork having an upper member 24 and a lower member 25. The top skillet 2 has a corresponding hinge member lug 26 extended outwardly into the hinge member 24 and carrying the cross pin 27 readily separable from the lower member by swinging action. This is lowered effectively in place when the top part is placed on the lower part with the pin 27 rising in the notch 23.

Within the bottom skillet 1, I place a grill plate 28, the cross bars of which are flat on their underside. The same is preferably made of aluminum or aluminum alloy. This rests upon the bottom in snug relation and is very effective in holding bacon flat while it is being fried. The grill also is effective in grilling meat or any food which is effectively and properly cooked by such grilling. The grill also supports a pie tin or a frying pan in such manner that it will not be exposed to direct heat and cause over-cooking.

When it is desired to use my improved cooking utensil for baking purposes, when it is desired to brown the article being cooked, such as a pudding or a pie, a small object such as a match is inserted between the members 1 and 2 in proximity to the handles.

The whole interior is effectively sealed by the slight accumulation of moisture in the annular groove 4 when it is desired for the usual cooking without the admission of air.

The top skillet or part 2 is a counterpart of the bottom 1 with the exception that it carries the downwardly projecting rib 6. The weight of the part and the sealing rings hold the same together effectively so that no fastener is required for the handles. However, such fastener could be very readily added if any special circumstances required it.

My compound skillets are made of a special alloy that is hard and resistant and consequently the smooth interior surfaces of the skillet can be very readily cleaned by the use of an abrasive or mineral wool or the like. They may, of course, be scraped in the usual way, but are very readily cleaned when made use of according to the improved waterless method of cooking without use of a dishpan full of water, although they may be cleaned in the usual way.

The particular form that I have given the top plate and the bottom plate permits of the expansion without undue contortion and without perceptibly interfering with the level smooth surface within. Of course the central disk remains in disk form and the annular grooves about the same permit expansion at the lighter part of the metal which may throw the adjacent rings slightly up or slightly down without any material irregular distortion. The radial ribs constituting the star part contact at evenly separated points with the supporting flange rings and insure the even heating or cooling of the same and the consequent regularity of expansion because of the distribution of the heat. This structure is intended to be used over a gas plate or any burner head and will accomplish the great variety of cooking that I have above indicated.

Having thus described my invention, what I claim as new and desire to secure by Letters Patent is:

1. A double skillet structure with handles square in cross section, a bottom flanged outwardly at its periphery and containing a semicircular annular groove in its upper surface and a top part flanged at its periphery and bearing a corresponding annular rib to fit said groove, a hinge connection between the parts formed of an integral lug on the lower part bifurcated with outwardly disposed notches, the top lug part adapted to fit in said bifurcated part and bearing a corresponding hinge member adapted to enter between the bifurcations of the lower hinge and provided with a cross pin to separably cooperate with the said outwardly disposed notches.

2. A skillet with a bottom plate provided with a peripheral flange supporting ring, a central disk of thicker metal than the body, the lower surface of which is disposed above the lower surface of the skillet bottom, concentric annular grooves forming concentric annular rings about the said central disk, and raised radially disposed ribs between the peripheral ring and the said central ring in A-shaped relation and distributed equally about the said rings to insure the dissipation of heat evenly and thereby avoid irregular expansion and insure the practical even surface for said bottom plate.

WILLIAM A. BURNETTE.